(12) United States Patent
Kim et al.

(10) Patent No.: US 11,137,203 B2
(45) Date of Patent: Oct. 5, 2021

(54) SYSTEM FOR UTILIZING CARBON DIOXIDE OF FLUE GAS CAPTURED BY COLD HEAT OF LIQUEFIED NATURAL GAS

(71) Applicant: DOOSAN HEAVY INDUSTRIES & CONSTRUCTION CO., LTD., Changwon-si (KR)

(72) Inventors: Sanghyeun Kim, Yongin-si (KR); Hwachang Sung, Seoul (KR); Songhun Cha, Osan-si (KR)

(*) Notice: Subject to any disclaimer, the term of this patent is extended or adjusted under 35 U.S.C. 154(b) by 239 days.

(21) Appl. No.: 16/009,171

(22) Filed: Jun. 14, 2018

(65) Prior Publication Data

US 2019/0072324 A1 Mar. 7, 2019

(30) Foreign Application Priority Data

Sep. 5, 2017 (KR) .......... 10-2017-0113158

(51) Int. Cl.
*B01D 1/00* (2006.01)
*B01D 7/00* (2006.01)
(Continued)

(52) U.S. Cl.
CPC .......... *F25J 1/0057* (2013.01); *B01D 1/0047* (2013.01); *B01D 7/00* (2013.01); *B01D 7/02* (2013.01);
(Continued)

(58) Field of Classification Search
CPC ........ F25J 1/0222; F25J 1/0223; F25J 1/0027; F25J 1/0278; F25J 2290/72;
(Continued)

(56) References Cited

U.S. PATENT DOCUMENTS 2,975,608 A * 3/1961 Morrison .................. F17C 9/04
62/50.2
3,316,968 A * 5/1967 Nettles .................. E21B 43/122
166/309
(Continued)

FOREIGN PATENT DOCUMENTS

JP 08269469 A * 10/1996 ............. F25J 1/0022
JP H08-269469 A 10/1996
(Continued)

OTHER PUBLICATIONS

Brown et al., Chemistry: The Central Science, Nov. 14, 2014, Chapter 11, Section 6 (Year: 2014).*
(Continued)

*Primary Examiner* — Larry L Furdge
*Assistant Examiner* — Chang H Park
(74) *Attorney, Agent, or Firm* — Harvest IP Law, LLP

(57) ABSTRACT

A system captures carbon dioxide from a flue gas of a power generation facility by using cold heat of liquefied natural gas and utilizes the captured carbon dioxide for mining natural gas, using heat of the flue gas to regasify the LNG. Solidified dry ice is captured from gaseous carbon dioxide contained in the flue gas, and the captured dry ice is used as filler when mining natural gas. The system includes a mining facility, a vehicle to transport LNG liquefied by the mining facility; and a facility for regasifying the transported LNG and capturing dry ice from the carbon dioxide. In the regasification and capture facility, the flue gas exchanges heat with the LNG, thereby regasifying the LNG at an increased temperature and capturing the dry ice from the carbon dioxide. The captured dry ice is transported to the mining facility, which uses it for mining the natural gas.

18 Claims, 7 Drawing Sheets

(51) Int. Cl.
*B01D 7/02* (2006.01)
*E21B 43/16* (2006.01)
*F25J 1/00* (2006.01)
*F25J 1/02* (2006.01)
*F25J 3/02* (2006.01)

(52) U.S. Cl.
CPC ........... *E21B 43/164* (2013.01); *F25J 1/0022* (2013.01); *F25J 1/0027* (2013.01); *F25J 1/0222* (2013.01); *F25J 1/0223* (2013.01); *F25J 1/0228* (2013.01); *F25J 1/0278* (2013.01); *F25J 3/0266* (2013.01); *B01D 2257/504* (2013.01); *B01D 2258/0283* (2013.01); *F25J 2205/20* (2013.01); *F25J 2210/62* (2013.01); *F25J 2210/70* (2013.01); *F25J 2220/82* (2013.01); *F25J 2260/80* (2013.01); *F25J 2270/904* (2013.01); *F25J 2290/72* (2013.01)

(58) Field of Classification Search
CPC ...... F25J 2260/80; F25J 1/0057; F25J 1/0228; F25J 2205/20; F25J 2210/62; F25J 2210/70; F25J 2220/82; F25J 2270/904; F25J 3/0266; B01D 1/0047; B01D 2257/504; B01D 2258/0283; B01D 7/00; B01D 7/02; E21B 43/164; F01K 23/14; F02C 3/22; F02C 6/18; F17D 3/01
See application file for complete search history.

(56) References Cited

U.S. PATENT DOCUMENTS 3,855,810 A * 12/1974 Simon .................. F25J 1/0022
62/612
2012/0247781 A1 10/2012 Noble et al.

FOREIGN PATENT DOCUMENTS

KR 10-2002-0025966 A 4/2002
KR 10-2004-0023798 A 3/2004
KR 10-2012-0131559 A 12/2012

OTHER PUBLICATIONS

Songhurst, The Outlook for Floating Storage and Regasification Units (FSRUs), Jul. 2017, Oxford Institute for Energy Studies, OIES Paper: NG 123 (Year: 2017).*
Natgas, Offshore Drilling, Sep. 22, 2013, NaturalGas.org, http://naturalgas.org/naturalgas/extraction-offshore/ (Year: 2013).*
A Korean Office Action dated Sep. 10, 2018 in connection with Korean Patent Application No. 10-2017-0113158 which corresponds to the above-referenced U.S. application.
NPL_Great Energy (Natural Gas Hydrate) Xiao Gang et al.
CN Office Action dated May 28, 2021.

* cited by examiner

SYSTEM FOR UTILIZING CARBON DIOXIDE OF FLUE GAS CAPTURED BY COLD HEAT OF LIQUEFIED NATURAL GAS

CROSS-REFERENCE TO RELATED APPLICATIONS

This application claims priority to and the benefit of Korean Patent Application No. 10-2017-0113158 filed in the Korean Intellectual Property Office on Sep. 5, 2017, the entire contents of which are incorporated herein by reference.

BACKGROUND OF THE INVENTION

Field of the Invention

The present invention relates to a system for capturing carbon dioxide from a flue gas of a power generation facility by using cold heat of liquefied natural gas and for utilizing the captured carbon dioxide for mining natural gas.

Description of the Related Art

Natural gas refers to both hydrocarbon and non-hydrocarbon materials that are naturally produced underground and form a gas phase in a surface condition. Normally, natural gas is composed mostly of methane ($CH_4$), which makes up 80 to 90% by volume, and other flammable gases such as ethane ($C_2H_6$) and propane ($C_3H_8$), but there are variations in composition depending on the place of production. Liquefied natural gas (LNG) refers to natural gas artificially liquefied at a low temperature of about −160 degrees centigrade.

Natural gas and crude oil are mined in an oil field. To facilitate mining, filler such as steam, groundwater, seawater, or carbon dioxide is injected into the oil field. The mined natural gas is transported to the place of consumption in a liquefied state such as LNG. After transportation, LNG needs to be regasified for use or distribution.

For regasification of LNG, seawater may be used. However, the use of seawater may have an unexpected influence on marine ecosystems. In other systems, LNG may be regasified through heat generated by burning natural gas. However, this regasification scheme causes a waste of energy.

SUMMARY OF THE INVENTION

It is an object of the present invention to provide a system for capturing carbon dioxide from a flue gas of a power generation facility by using cold heat of liquefied natural gas (LNG) while increasing the power generation efficiency.

It is another object of the present invention to provide a system for utilizing the captured carbon dioxide as filler in an oil field when mining natural gas.

According to an embodiment of the present invention, a system for utilizing carbon dioxide of a flue gas captured by cold heat of liquefied natural gas (LNG) comprises a mining facility, a transportation vehicle, a regasification and capture facility, and a power generation facility. The mining facility mines natural gas. The transportation vehicle transports the LNG obtained by liquefying the natural gas mined by the mining facility. The regasification and capture facility regasifies the LNG transported by the transportation vehicle and also captures dry ice from the carbon dioxide of the flue gas. The power generation facility generates electricity by using the natural gas obtained by regasifying the LNG at the regasification and capture facility or by using other fuel. In the regasification and capture facility, the flue gas produced at the power generation facility and the LNG exchange heat with each other such that the LNG is regasified at an increased temperature and that the dry ice is captured from the carbon dioxide contained in the flue gas. The transportation vehicle transports the captured dry ice to the mining facility. The mining facility uses the transported dry ice for mining the natural gas.

The system may further comprise an LNG storage facility that stores the LNG transported by the transportation vehicle. The LNG stored in the LNG storage facility may be supplied to the regasification and capture facility. The LNG storage facility may be a floating gas storage facility.

The regasification and capture facility may include an intermediate fluid for performing a heat exchange between the LNG and the flue gas.

The regasification and capture facility may further include a buffer for preventing explosion due to expansion of the intermediate fluid.

The system may further comprise a floating facility that includes the regasification and capture facility and the power generation facility and also has a structure being floatable on a sea.

The LNG storage facility may be a floating gas storage facility.

The floating facility may include a first floating portion on which the regasification and capture facility is installed, and a second floating portion on which the power generation facility is installed. The floating facility may further include a floating connector that connects the regasification and capture facility and the power generation facility. The floating connector may contain an intermediate fluid flowing therethrough and exchanging heat between the LNG and the flue gas.

According to an embodiment of the present invention, a system for utilizing carbon dioxide of a flue gas captured by cold heat of liquefied natural gas (LNG) comprises a mining-site facility, a transportation vehicle, and a consumer-site facility. The mining-site facility includes a mining facility for mining natural gas and further includes a liquefier for liquefying the mined natural gas into the LNG. The transportation vehicle transports the LNG. The consumer-site facility includes an LNG storage facility, a regasification and capture facility, and a power generation facility. The LNG storage facility stores the LNG transported by the transportation vehicle. The regasification and capture facility regasifies the LNG stored in the LNG storage facility and also captures dry ice from the carbon dioxide of the flue gas. The power generation facility generates electricity by using the natural gas obtained by regasifying the LNG at the regasification and capture facility or by using other fuel. In the regasification and capture facility, the flue gas produced at the power generation facility and the LNG exchange heat with each other such that the LNG is regasified at an increased temperature and that the dry ice is captured from the carbon dioxide contained in the flue gas. The transportation vehicle transports the captured dry ice to the mining-site facility. The mining-site facility uses the transported dry ice for mining the natural gas.

The mining-site facility may further include a heater for vaporizing or liquefying the transported dry ice.

The heater may heat the dry ice by using heat generated in the liquefier. In addition, the heater may withstand a pressure of 5 bar or more without a change in volume during a heating process.

The heater may heat the dry ice by using at least one of seawater, air, and an electric heater.

According to an embodiment of the present invention, a system for utilizing carbon dioxide of a flue gas captured by cold heat of liquefied natural gas (LNG) comprises a plurality of mining-site facilities, a plurality of transportation vehicles, and a plurality of consumer-site facilities. Each of the plurality of mining-site facilities mines natural gas or crude oil. Each of the plurality of transportation vehicles transports the LNG obtained by liquefying the natural gas mined in at least one of the mining-site facilities. Each of the plurality of consumer-site facilities regasifies the transported LNG. Each of the plurality of mining-site facilities includes a mining facility for mining natural gas, and a liquefier for liquefying the mined natural gas into the LNG. Each of the plurality of consumer-site facilities includes an LNG storage facility for storing the LNG transported by the transportation vehicle, a regasification and capture facility for regasifying the LNG stored in the LNG storage facility and for capturing dry ice from the carbon dioxide of the flue gas, and a power generation facility generating electricity by using the natural gas obtained by regasifying the LNG at the regasification and capture facility or by using other fuel. In the regasification and capture facility, the flue gas produced at the power generation facility and the LNG exchange heat with each other such that the LNG is regasified at an increased temperature and that the dry ice is captured from the carbon dioxide contained in the flue gas. The transportation vehicle transports the captured dry ice to at least one of the plurality of mining-site facilities. Each of the plurality of mining-site facilities uses the transported dry ice for mining the natural gas.

The system may further comprise a control facility that instructs each of the transportation vehicles about a voyage route between the mining-site facilities and the consumer-site facilities.

The control facility may include a mining-site sensing device and a consumer-site sensing unit. The mining-site sensing device may determine a quantity of dry ice required in the respective mining-site facilities. The consumer-site sensing unit may determine a quantity of dry ice produced in the respective consumer-site facilities. Based on the quantities determined by the mining-site sensing device and the consumer-site sensing device, the control facility may determine the voyage route of each transportation vehicle.

Each of the mining-site facilities may further include a heater for vaporizing or liquefying the transported dry ice by using heat generated in the liquefier.

At least one of the plurality of consumer-site facilities may be installed to be floatable on a sea. In addition, at least one of the LNG storage facility, the regasification and capture facility, and the power generation facility included in each of the plurality of consumer-site facilities may be installed to be floatable on a sea. Each of the plurality of consumer-site facilities may further include a connector that connects the regasification and capture facility and the power generation facility. The connector may contain an intermediate fluid flowing therethrough and exchanging heat between the LNG and the flue gas.

According to embodiments of the present invention, by using the LNG cold heat, it is possible to increase the power generation efficiency and also utilize the dry ice of the carbon dioxide captured from the flue gas of the power generation facility when mining the natural gas. Therefore, it is possible to reduce the generation of carbon dioxide, to generate profit through carbon emission rights, and to improve the performance of mining the natural gas.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
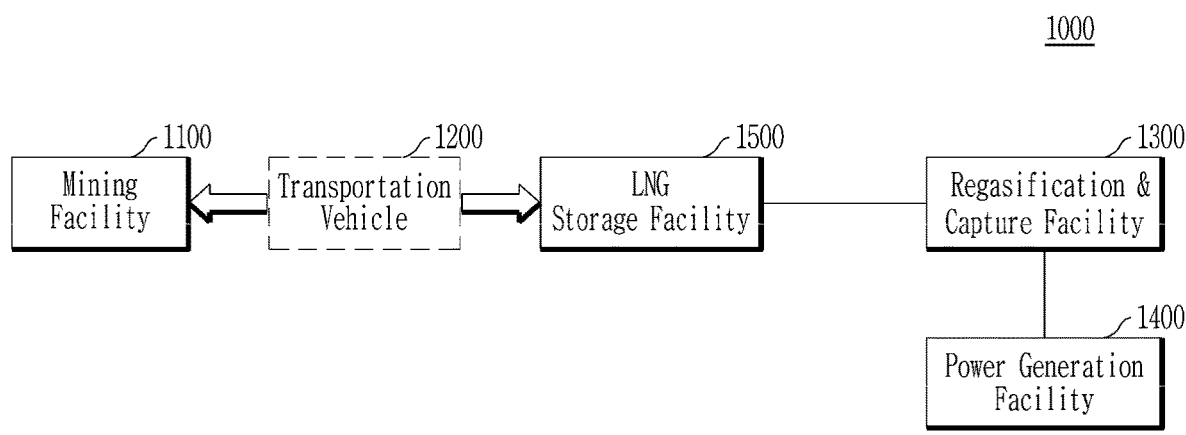
FIG. 1 is a block diagram illustrating a system for utilizing carbon dioxide of a flue gas captured by cold heat of liquefied natural gas according to an embodiment of the present invention.

Hereinafter, various embodiments of the present invention will be described in detail with reference to the accompanying drawings. It should be understood that the present invention is not intended to be limited to embodiments disclosed herein and includes various modifications, equivalents, and/or alternatives of the disclosed embodiments.

Terminology used herein is merely for the purpose of describing particular embodiments and is not intended to limit the invention. Singular forms utilizing "a," "an," and "the" are intended to include plural forms unless the context clearly dictates otherwise. In addition, terms such as "comprise," "include," and "have" are intended to specify the presence of stated elements, components, operations, functions, features, steps, or the like, without excluding the presence or possibility of additional other elements, components, operations, functions, features, steps, or the like.

The following description of embodiments may omit descriptions of techniques that are well known in the art or not directly related to the present disclosure. This is to clearly convey the subject matter of the present disclosure by omitting unnecessary explanation. For the same reason, some elements in the drawings may be exaggerated, omitted, or schematically illustrated. Also, the size of each element does not entirely reflect the actual size. In the drawings, the same or corresponding elements are denoted by the same reference numerals.

Figure 2:
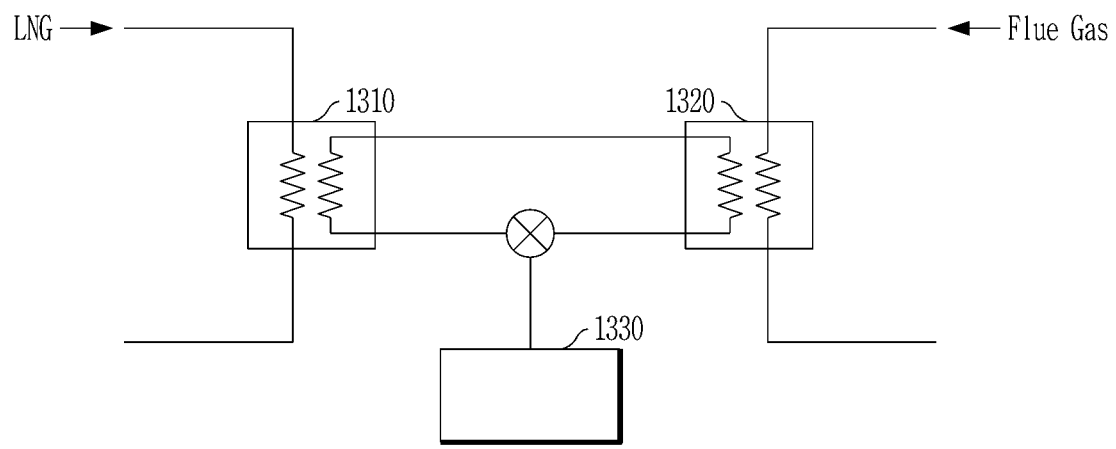
FIG. 2 is a diagram conceptually illustrating a heat exchange using an intermediate fluid in a regasification and capture facility according to an embodiment of the present invention.

FIG. 1 illustrates a system for utilizing carbon dioxide of a flue gas captured by cold heat of liquefied natural gas according to an embodiment of the present invention, and FIG. 2 conceptually illustrates a heat exchange using an intermediate fluid in a regasification and capture facility according to an embodiment of the present invention.

As shown in FIG. 1, a system 1000 for utilizing carbon dioxide of a flue gas captured by cold heat of liquefied natural gas (LNG) according to an embodiment of the present invention includes a mining facility 1100, a transportation vehicle 1200, a regasification and capture facility 1300, and a power generation facility 1400.

The mining facility 1100 is configured to mine natural gas. In order to mine natural gas in an oil field, that is, in order to extract natural gas buried underground, the mining facility 1100 includes a drilling machine and the like. In one embodiment, for the extraction of natural gas, the mining facility 1100 may further include an apparatus for injecting a filler into an oil field.

The transportation vehicle 1200, which is means of transportation, transports the natural gas mined by the mining facility 1100. The mined natural gas is liquefied and then transported in a state of LNG. In one embodiment, the transportation vehicle 1200 may be a seagoing vessel. In other embodiments, the transportation vehicle 1200 may include various means such as aircraft or land-based vehicles.

The regasification and capture facility 1300 not only regasifies, using heat of a flue gas, the LNG transported by the transportation vehicle 1200, but also captures solidified dry ice from gaseous carbon dioxide contained in the flue gas. For this, the regasification and capture facility 1300 may include a heat exchanger capable of exchanging heat between the LNG and the flue gas.

The natural gas regasified by the regasification and capture facility 1300 is supplied partly to consumers and supplied partly to the power generation facility 1400. Using the regasified natural gas, the power generation facility 1400 generates electricity. In another embodiment, the power generation facility 1400 may generate electricity by using other fuels. The flue gas is generated in power generation facility 1400. For example, the power generation facility 1400 may be a gas turbine generator or a combined-cycle power generation system.

The dry ice captured by the regasification and capture facility 1300 is transported to the mining facility 1100 by the transportation vehicle 1200. Here, the transportation vehicle 1200 used for transportation of the dry ice may be the same vehicle used for transportation of the LNG or may be a different one. The solidified dry ice is conducive to transportation and storage in comparison with a liquid state.

The mining facility 1100 uses the dry ice for natural gas mining. Specifically, the mining facility 1100 can use the dry ice as a filler injected into an oil field. Because the density of carbon dioxide that forms the dry ice is greater than that of methane and ethane, the dry ice sinks to the bottom of the oil field. This results in facilitated mining because methane and ethane which have relatively low densities are replaced by the dry ice.

In another embodiment, the system 1000 may further include an LNG storage facility 1500. The LNG carried by the transportation vehicle 1200 is stored in the LNG storage facility 1500. Then, the LNG stored in the LNG storage facility 1500 is supplied to the regasification and capture facility 1300 and regasified through a heat exchange with the flue gas.

In one embodiment, the LNG storage facility 1500 may be a floating gas storage facility, which may be in the form of a seagoing vessel. In another embodiment, the LNG storage facility 1500 may be a floating storage and regasification unit (FSRU).

The regasification and capture facility 1300 may perform a direct heat exchange between the LNG and the flue gas. In another embodiment, the regasification and capture facility 1300 may perform an indirect heat exchange between the LNG and the flue gas through an intermediate fluid, as shown in FIG. 2. In FIG. 2, the regasification and capture facility 1300 includes a first heat exchanger 1310 and a second heat exchanger 1320. In the first heat exchanger 1310, the LNG and the intermediate fluid exchange heat with each other, so that the LNG is regasified and the temperature of the intermediate fluid is lowered. In the second heat exchanger 1320, the intermediate fluid and the flue gas exchange heat with each other, so that the temperature of the intermediate fluid increases and the carbon dioxide of the flue gas is captured in the form of dry ice. The intermediate fluid may be a stable gas such as nitrogen.

In one embodiment, the regasification and capture facility 1300 may further include a buffer 1330. The buffer 1330 prevents explosion due to expansion of the intermediate fluid. The buffer 1330 may have a valve to regulate the inflow of the intermediate fluid.

Figure 3:
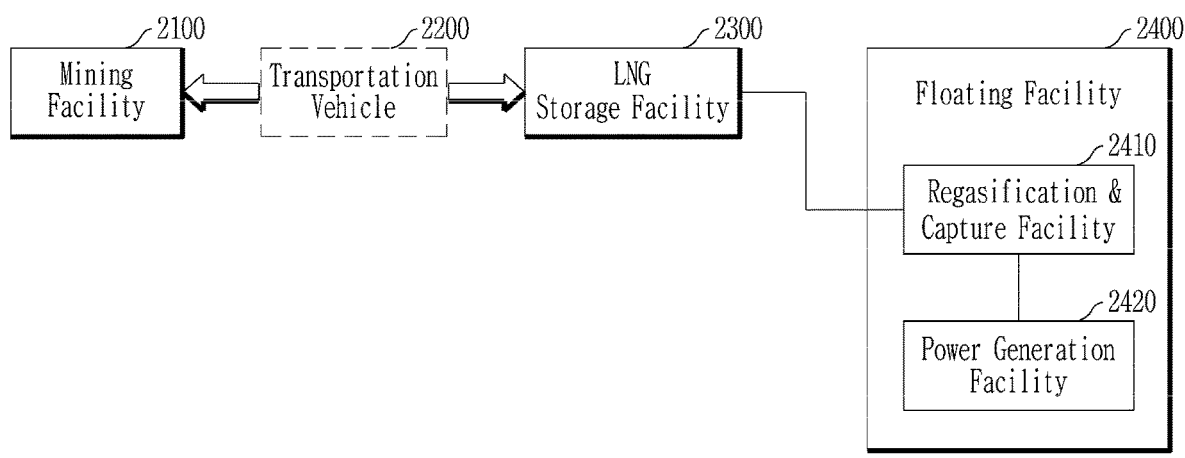
FIG. 3 is a block diagram illustrating a system including a floating facility and utilizing carbon dioxide of a flue gas captured by cold heat of liquefied natural gas according to an embodiment of the present invention.
Figure 4:
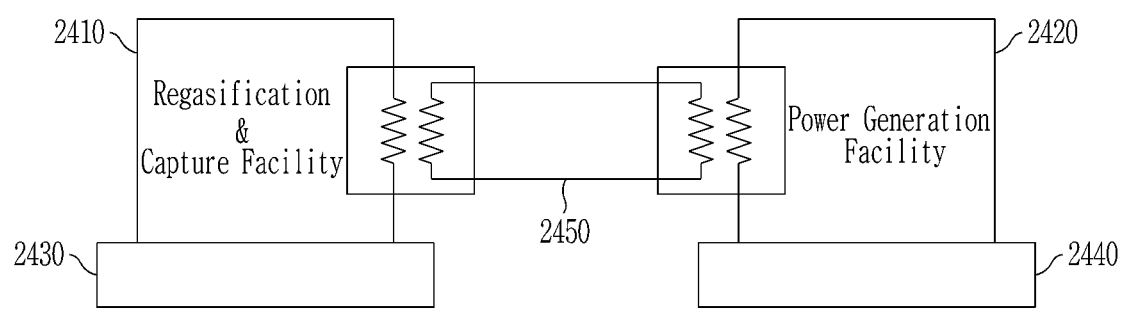
FIG. 4 is a diagram conceptually illustrating a floating facility according to an embodiment of the present invention.

FIG. 3 illustrates a system including a floating facility and utilizing carbon dioxide of a flue gas captured by cold heat of liquefied natural gas according to an embodiment of the present invention, and FIG. 4 conceptually illustrates a floating facility according to an embodiment of the present invention.

As shown in FIG. 3, a system 2000 for utilizing carbon dioxide of a flue gas captured by cold heat of liquefied natural gas (LNG) according to an embodiment of the present invention includes a mining facility 2100, a transportation vehicle 2200, an LNG storage facility 2300, and a floating facility 2400. The mining facility 2100, the transportation vehicle 2200, and the LNG storage facility 2300 are similar to those described above in FIG. 1, and thus their detailed description will be omitted.

The floating facility 2400 includes a regasification and capture facility 2410 and a power generation facility 2420. The floating facility 2400 is a structure being floatable on the sea, and may be a seagoing vessel or the like.

The regasification and capture facility 2410 not only regasifies, using heat of a flue gas from the power generation facility 2420, the LNG stored in the LNG storage facility 2300, but also captures solidified dry ice from gaseous carbon dioxide contained in the flue gas. For this, the regasification and capture facility 2410 may include a heat exchanger capable of a heat exchange between the LNG and the flue gas. The power generation facility 2420 generates electricity by using the LNG regasified by the regasification and capture facility 2410 or using other fuels.

In one embodiment, the LNG storage facility 2300 may be a floating gas storage facility. As shown in FIG. 4, the floating facility 2400 may further include a first floating portion 2430 and a second floating portion 2440. The regasification and capture facility 2410 may be installed on the first floating portion 2430, and the power generation facility 2420 may be installed on the second floating portion 2440. That is, the regasification and capture facility 2410 and the power generation facility 2420 may be installed on different floating portions, respectively, and thus be spaced apart from each other.

The floating facility 2400 may further include a floating connector 2450 that connects the regasification and capture facility 2410 and the power generation facility 2420. The floating connector 2450 contains an intermediate fluid flowing therethrough and exchanging heat between the LNG and the flue gas. That is, the LNG and the flue gas indirectly exchange heat with each other through the intermediate fluid. The floating connector 2450 may have a buffer for preventing explosion due to the expansion of the intermediate fluid.

Figure 5:
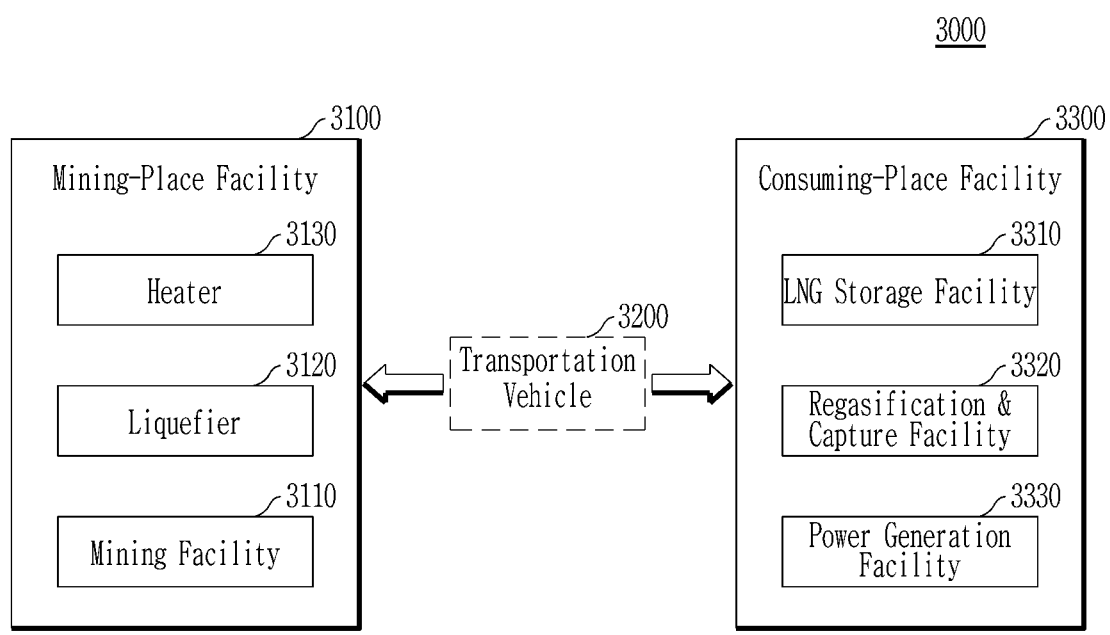
FIG. 5 is a block diagram illustrating a system including a mining-site facility and a consumer-site facility and utilizing carbon dioxide of a flue gas captured by cold heat of liquefied natural gas according to an embodiment of the present invention.

FIG. 5 illustrates a system including a mining-site facility and a consumer-site facility and utilizing carbon dioxide of a flue gas captured by cold heat of liquefied natural gas according to an embodiment of the present invention.

As shown in FIG. 5, a system 3000 for utilizing carbon dioxide of a flue gas captured by cold heat of liquefied natural gas (LNG) according to an embodiment of the present invention includes a mining-site facility 3100, a transportation vehicle 3200, and a consumer-site facility 3300.

The mining-site facility 3100 includes a mining facility 3110 and a liquefier 3120. The mining facility 3110 may include a drilling machine, an apparatus for injecting a filler, and the like. The liquefier 3120 liquefies natural gas into LNG. When the liquefier 3120 liquefies natural gas, heat may be generated.

The transportation vehicle 3200 transports the LNG which is obtained in the liquefier 3120. That is, the transportation vehicle 3200 transports the natural gas, mined and liquefied in the mining-site facility 3100, to the consumer-site facility 3300.

The consumer-site facility 3300 includes an LNG storage facility 3310, a regasification and capture facility 3320, and a power generation facility 3330. The LNG storage facility 3310, the regasification and capture facility 3320, and the power generation facility 3330 are similar to those described above in FIGS. 1 to 4, and thus their detailed description will be omitted.

The regasification and capture facility 3320 not only regasifies, using heat of a flue gas from the power generation facility 3330, the LNG stored in the LNG storage facility 3310, but also captures solidified dry ice from gaseous carbon dioxide contained in the flue gas. The dry ice captured by the regasification and capture facility 3320 is transported to the mining-site facility 3100 by the transportation vehicle 3200. In the mining-site facility 3100, the mining facility 3110 uses the dry ice as a filler to be injected for natural gas mining.

In another embodiment, the mining-site facility 3100 may further include a heater 3130. In order to use, as a filler, the dry ice carried by the transportation vehicle 3200, the heater 3130 vaporizes or liquefies the solidified dry ice. That is, the heater 3130 changes the state of matter of the solidified dry ice to a higher state. The heater 3130 may heat the dry ice by using seawater. In another embodiment, the heater 3130 may heat the dry ice by using the heat generated in the liquefier 3120. For this, the heater 3130 may include a heat exchanger that exchanges heat with the liquefier 3120.

The heater 3130 may be made to withstand a pressure of 5 bar or more without any change in volume during the heating process. When heat is supplied to the heater 3130, an internal pressure of the heater 3130 becomes high while the solidified dry ice is vaporized. At this time, if carbon dioxide is extracted at an internal pressure of 5 bar or more and at a temperature of −56 degrees centigrade or more, it is possible to obtain liquid carbon dioxide without additional auxiliary power.

Figure 6:
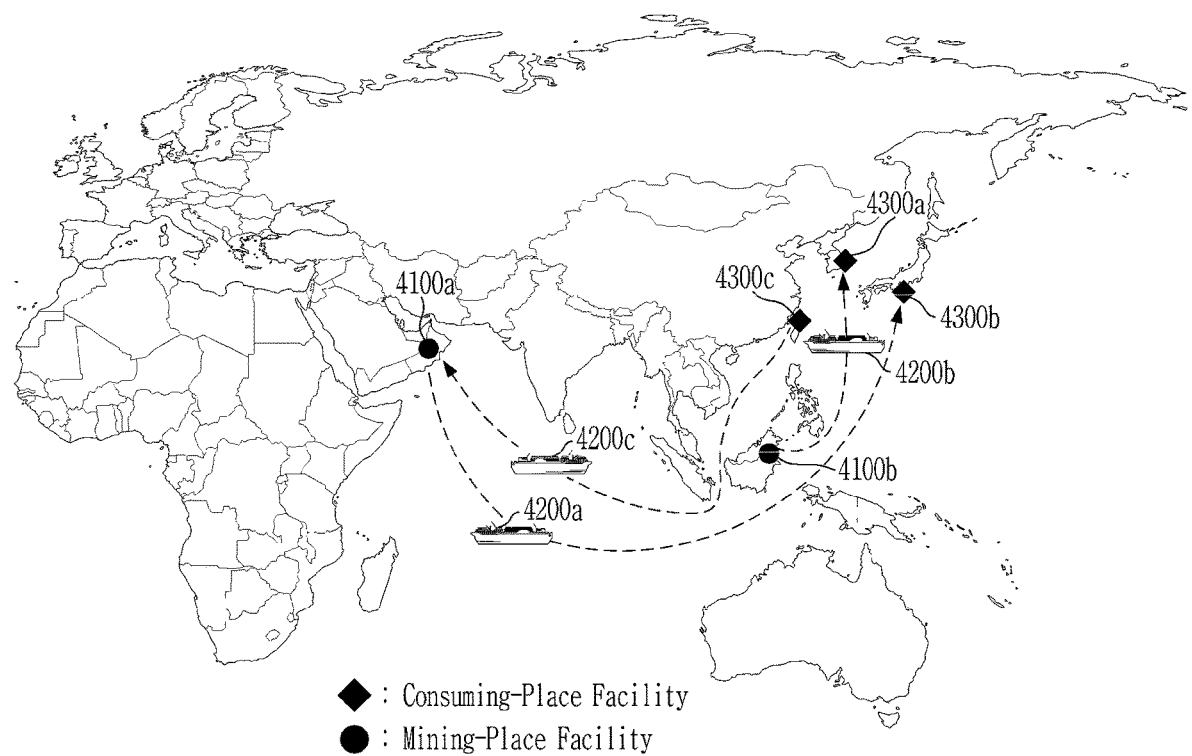
FIG. 6 is a diagram conceptually illustrating a system including a plurality of mining-site facilities and a plurality of consumer-site facilities and utilizing carbon dioxide of a flue gas captured by cold heat of liquefied natural gas according to an embodiment of the present invention.
Figure 7:
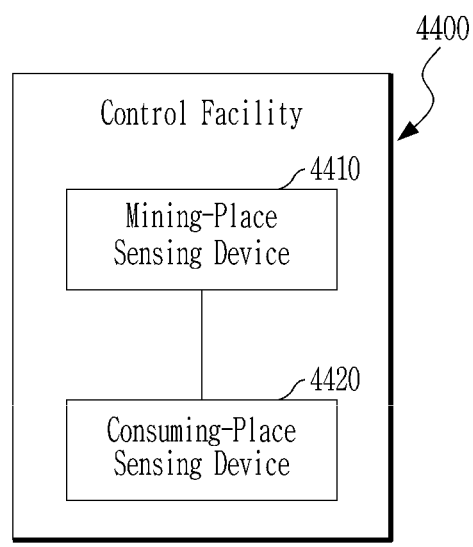
FIG. 7 is a block diagram illustrating a control facility according to an embodiment of the present invention.

FIG. 6 conceptually illustrates a system including a plurality of mining-site facilities and a plurality of consumer-site facilities and utilizing carbon dioxide of a flue gas captured by cold heat of liquefied natural gas according to an embodiment of the present invention, and FIG. 7 illustrates a control facility according to an embodiment of the present invention.

As shown in FIG. 6, a system for utilizing carbon dioxide of a flue gas captured by cold heat of liquefied natural gas (LNG) according to an embodiment of the present invention includes a plurality of mining-site facilities 4100a and 4100b, a plurality of transportation vehicles 4200a, 4200b, and 4200c, and a plurality of consumer-site facilities 4300a, 4300b, and 4300c. Although two mining-site facilities, three transportation vehicles, and three consumer-site facilities are used in this embodiment, these numbers are exemplary only and are not to be construed as a limitation.

Each of the mining-site facilities 4100a and 4100b mines natural gas or crude oil, or both.

Each of the transportation vehicles 4200a, 4200b, and 4200c transports the natural gas, mined and liquefied in one of the mining-site facilities 4100a and 4100b, to at least one of the consumer-site facilities 4300a, 4300b, and 4300c. In another embodiment, each of the transportation vehicles 4200a, 4200b, and 4200c may load the LNG from the respective mining-site facilities 4100a and 4100b and then unload the LNG to the respective consumer-site facilities 4300a, 4300b, and 4300c.

Each of the transportation vehicles 4200a, 4200b, and 4200c may transport the dry ice collected in at least one of the consumer-site facilities 4300a, 4300b, and 4300c to at least one of the mining-site facilities 4100a and 4100b. In this case, if the transportation vehicle 4200a loads the LNG from the mining-site facility 4100a, the transportation vehicle 4200a may then transport the dry ice to the mining-site facility 4100a only, or alternatively to the mining-site facility 4100b only, or alternatively to both. In another embodiment, each of the transportation vehicles 4200a, 4200b, and 4200c may pass through the plurality of consumer-site facilities 4300a, 4300b, and 4300c and the plurality of mining-site facilities 4100a and 4100b.

In an embodiment, this system may further include a control facility 4400 as shown in FIG. 7. The control facility 4400 instructs each of the transportation vehicles 4200a, 4200b, and 4200c about a voyage route between the mining-site facilities 4100a and 4100b and the consumer-site facilities 4300a, 4300b, and 4300c. For example, the control facility 4400 may instruct the first transportation vehicle 4200a to transport the LNG from the first mining-site facility 4100a to the second consumer-site facility 4300b. Also, the control facility 4400 may instruct the third transportation vehicle 4200c to transport the dry ice from the third consumer-site facility 4300c to the first mining-site facility 4100a.

The control facility 4400 may include a mining-site sensing device 4410 and a consumer-site sensing device 4420. The mining-site sensing device 4410 determines the quantity of dry ice required in the respective mining-site facilities 4100a and 4100b. The consumer-site sensing device 4420 determines the quantity of dry ice produced in the respective consumer-site facilities 4300a, 4300b, and 4300c. Based on these quantities determined by the mining-site sensing device 4410 and the consumer-site sensing device 4420, the control facility 4400 determines a voyage route of each of transportation vehicles 4200*a*, 4200*b*, and 4200*c*. For example, the second transportation vehicle 4200*b* that has transported the LNG from the second mining-site facility 4100*b* to the first consumer-site facility 4300*a* may load the dry ice from the second consumer-site facility 4300*b* and then transport the dry ice to the first mining-site facility 4100*a* under the instructions of the control facility 4400. It is therefore possible to efficiently operate the plurality of transportation vehicles 4200*a*, 4200*b*, and 4200*c*.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. A system for utilizing carbon dioxide of a flue gas captured by cold heat of liquefied natural gas (LNG), the system comprising:
    a power generator configured to generate electricity and produce the flue gas;
    a mining apparatus for mining natural gas, the mining apparatus configured to drill in an oil field from which the natural gas is extracted and to replace the extracted natural gas by injecting a filler into the oil field;
    a transportation vehicle for transporting the LNG obtained by liquefying the natural gas mined by the mining facility; and
    a regasification and capture apparatus configured to regasify the LNG transported by the transportation vehicle and to capture dry ice from the carbon dioxide of the flue gas by receiving the flue gas from the power generator and perform a heat exchange between the LNG transported by the transportation vehicle and the flue gas produced by the power generator,
    wherein the power generator generates the electricity by using the natural gas obtained by regasifying the LNG in the regasification and capture apparatus,
    wherein, in the regasification and capture apparatus, the flue gas produced in the power generator exchanges heat with the LNG such that the LNG is regasified at an increased temperature and such that the dry ice is captured from the carbon dioxide contained in the flue gas,
    wherein the transportation vehicle transports the captured dry ice to the mining apparatus, and
    wherein the mining apparatus injects the carbon dioxide, as the filler, that forms the dry ice transported by the transportation vehicle to mine the natural gas.

2. The system of claim 1, further comprising:
    an LNG storage configured to store the LNG transported by the transportation vehicle,
    wherein the LNG stored in the LNG storage is supplied to the regasification and capture apparatus.

3. The system of claim 2, wherein the LNG storage is a floating gas storage.

4. The system of claim 2, further comprising:
    a floating apparatus including the regasification and capture apparatus and the power generator and having a structure being floatable on a sea, the floating apparatus being a seagoing vessel.

5. The system of claim 4, wherein the LNG storage is a floating gas storage.

6. The system of claim 4, wherein the floating apparatus includes a first floating portion on which the regasification and capture apparatus is installed, and a second floating portion on which the power generator is installed.

7. The system of claim 6, wherein the floating apparatus further includes a floating connector through which an intermediate fluid flows to exchange heat between the LNG of the regasification and capture apparatus and the flue gas of the power generator.

8. The system of claim 1, wherein the regasification and capture apparatus includes an intermediate fluid for performing the heat exchange between the LNG and the flue gas.

9. The system of claim 8, wherein the regasification and capture apparatus further includes a buffer for preventing explosion due to expansion of the intermediate fluid.

10. A system for utilizing carbon dioxide of a flue gas captured by cold heat of liquefied natural gas (LNG), the system comprising:
    a mining-site apparatus including a mining apparatus for mining natural gas and further including a liquefier for liquefying the mined natural gas into the LNG, the mining apparatus configured to drill in an oil field from which the natural gas is extracted and to replace the extracted natural gas by injecting a filler into the oil field;
    a transportation vehicle for transporting the LNG; and
    a consumer-site apparatus including
        a power generator configured to generate electricity and produce the flue gas,
        an LNG storage configured to store the LNG transported by the transportation vehicle, and
        a regasification and capture apparatus configured to regasify the LNG transported by the transportation vehicle and to capture dry ice from the carbon dioxide of the flue gas by receiving the flue gas from the power generator and perform a heat exchange between the LNG stored in the LNG storage and the flue gas produced by the power generator,
    wherein the power generator generates the electricity by using the natural gas obtained by regasifying the LNG at the regasification and capture apparatus,
    wherein, in the regasification and capture apparatus, the flue gas produced in the power generator exchanges heat with the LNG such that the LNG is regasified at an increased temperature and such that the dry ice is captured from the carbon dioxide contained in the flue gas,
    wherein the transportation vehicle transports the captured dry ice to the mining-site apparatus, and
    wherein the mining apparatus injects the carbon dioxide, as the filler, that forms the dry ice transported by the transportation vehicle to mine the natural gas.

11. The system of claim 10, wherein the mining-site apparatus further includes a heater for changing a state of the transported dry ice to a higher state.

12. The system of claim 11, wherein the heater heats the dry ice by using heat generated in the liquefier.

13. The system of claim 12, wherein the heater withstands a pressure of at least 5 bar without a change in volume during a heating process.

14. The system of claim 11, wherein the heater heats the dry ice by using at least one of seawater, air, and an electric heater.

15. A system for utilizing carbon dioxide of a flue gas captured by cold heat of liquefied natural gas (LNG), the system comprising:

a plurality of mining-site apparatuses, each for mining at least one of natural gas and crude oil;

a plurality of transportation vehicles, each for transporting the LNG obtained by liquefying the natural gas mined in at least one of the mining-site apparatuses; and a plurality of consumer-site apparatuses, each for regasifying the transported LNG, wherein each mining-site apparatus includes a mining apparatus for mining natural gas, and a liquefier for liquefying the mined natural gas into the LNG, the mining apparatus configured to drill in an oil field from which the natural gas is extracted and to replace the extracted natural gas by injecting a filler into the oil field, wherein each consumer-site apparatus includes
- a power generator configured to generate electricity and produce the flue gas,
- an LNG storage configured to store the LNG transported by the transportation vehicle, and
- a regasification and capture apparatus configured to regasify the LNG transported by the transportation vehicle and to capture dry ice from the carbon dioxide of the flue gas by receiving the flue gas from the power generator and perform a heat exchange between the LNG stored in the LNG storage and the flue gas produced by the power generator, wherein the power generator generates the electricity by using the natural gas obtained by regasifying the LNG in the regasification and capture apparatus, wherein, in the regasification and capture apparatus, the flue gas produced in the power generator exchanges heat with the LNG such that the LNG is regasified at an increased temperature and such that the dry ice is captured from the carbon dioxide contained in the flue gas, wherein the transportation vehicle transports the captured dry ice to at least one of the plurality of mining-site apparatuses, and wherein the mining apparatus injects the carbon dioxide, as the filler, that forms the dry ice transported by the transportation vehicle to mine the natural gas.

16. The system of claim 15, wherein each mining-site apparatus further includes a heater for changing a state of the transported dry ice to a higher state by using heat generated in the liquefier.

17. The system of claim 15, wherein at least one of the plurality of consumer-site apparatuses is installed to be floatable on a sea.

18. The system of claim 17,
wherein at least one of the LNG storage, the regasification and capture apparatus, and the power generator included in each consumer-site apparatus is installed to be floatable on a sea, and wherein each consumer-site apparatus further includes a connector through which an intermediate fluid flows to exchange heat between the LNG of the regasification and capture apparatus and the flue gas of the power generator.

* * * * *